No. 888,464. PATENTED MAY 26, 1908.
A. L. BURRI & B. C. DONNELLY.
SCALING MACHINE.
APPLICATION FILED JULY 11, 1907.

2 SHEETS—SHEET 1.

WITNESSES:
a. B. Cornelius
E. O. Gibbons

INVENTORS:
Albert L. Burri
Bertram C. Donnelly
BY
Eugene Ayres,
ATTORNEY.

No. 888,464. PATENTED MAY 26, 1908.
A. L. BURRI & B. C. DONNELLY.
SCALING MACHINE.
APPLICATION FILED JULY 11, 1907.

2 SHEETS—SHEET 2.

WITNESSES:
A. B. Cornelius
E. O. Gibbons

INVENTORS:
Albert L. Burri
Bertram C. Donnelly
BY
Eugene Ayres,
ATTORNEY.

UNITED STATES PATENT OFFICE.

ALBERT L. BURRI AND BERTRAM C. DONNELLY, OF ST. JOSEPH, MISSOURI.

SCALING-MACHINE.

No. 888,464.  Specification of Letters Patent.  Patented May 26, 1908.

Application filed July 11, 1907. Serial No. 383,346

*To all whom it may concern:*

Be it known that we, ALBERT L. BURRI and BERTRAM C. DONNELLY, citizens of the United States, residing at St. Joseph, in the county of Buchanan and State of Missouri, have invented certain new and useful Improvements in a Scaling-Machine; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1:
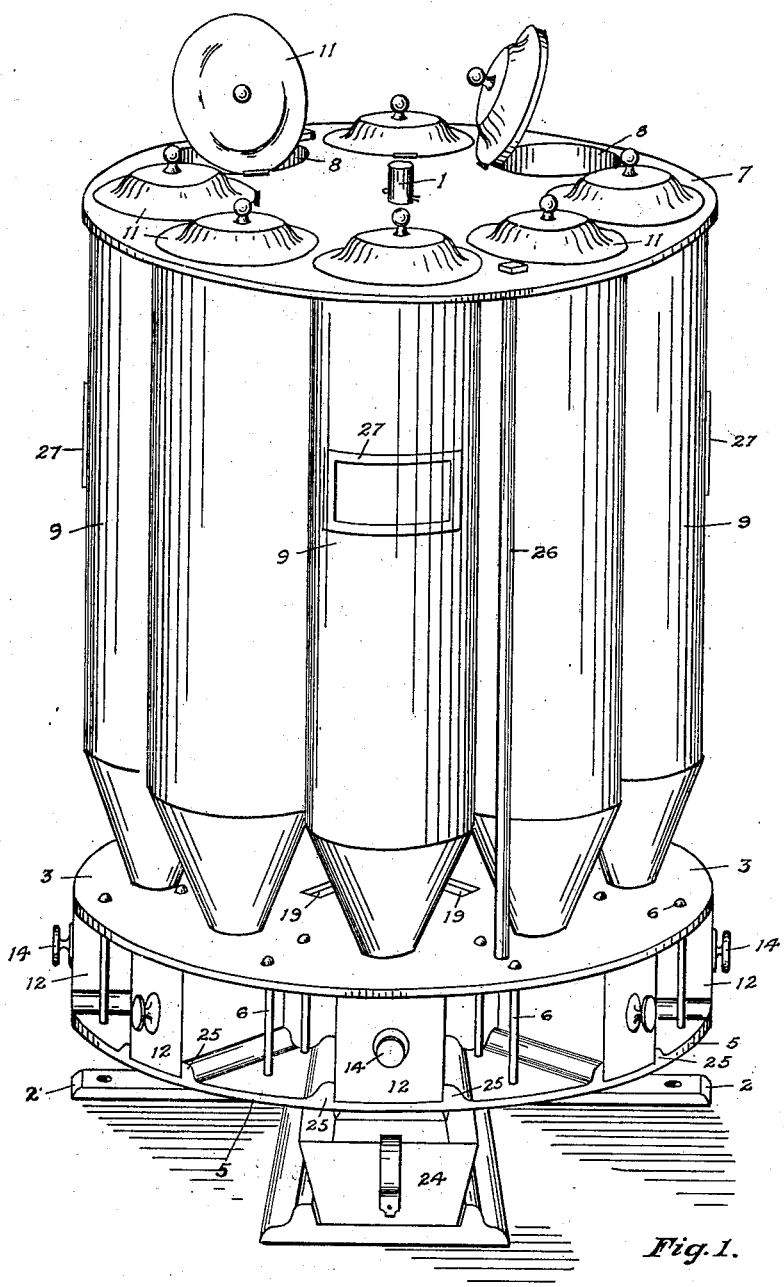
Figure 3:
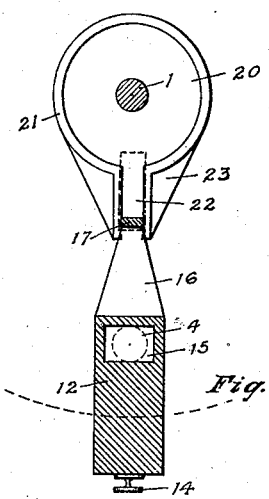
Figure 4:
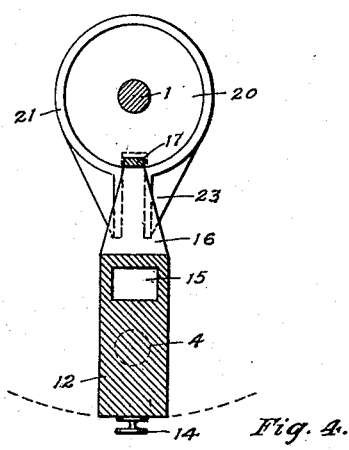
Figure 2:
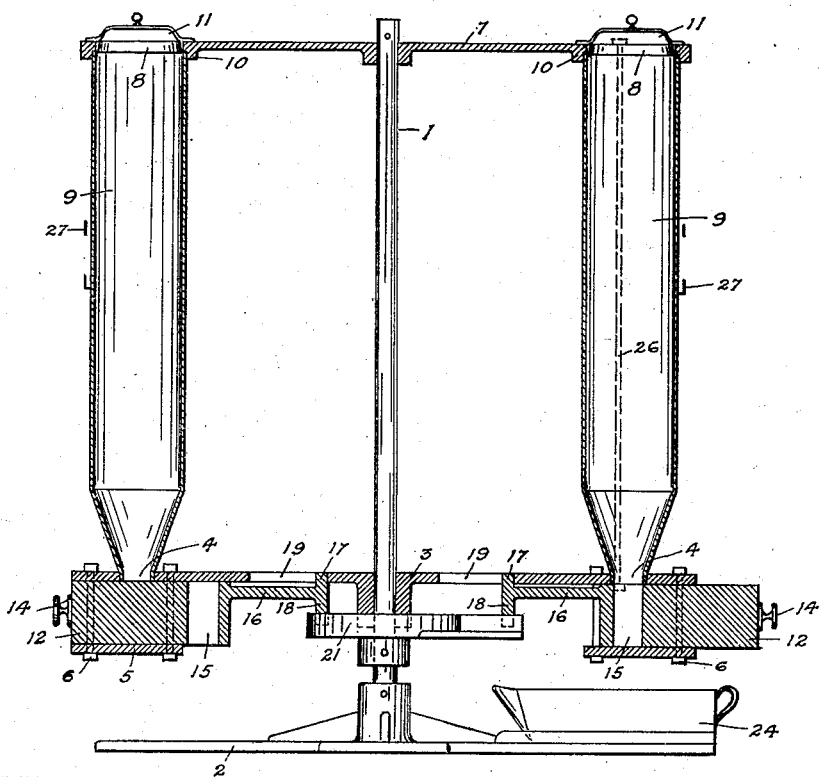

The object of our device is to accurately measure or scale seeds, grain, spices, coffee, tea, sugar and other materials of like classification. To accomplish this we construct a machine consisting of one or more tanks, each tank having one or more measuring or scaling slides, substantially as illustrated in the accompanying drawings, in which, Figure 1 is a perspective view of the entire machine; Fig. 2 is a sectional elevation of the machine shown with two tanks only and their slide mechanism, one slide open, the other closed; Fig. 3 is a sectional plan view of a lock plate and a slide, drawn out, ready to receive seed or other material, and Fig. 4 is a sectional plan of the same in closed position.

Similar numerals refer to similar parts in the several views.

1 is a shaft rigidly fixed on base 2 on which the entire machine is revoluble.

3 is a center diaphragm provided with a plurality of openings 4 4— spaced from its periphery and 5 is a bottom plate connected rigidly with the diaphragm by rods 6 6—.

7 is a top plate provided with openings 8 8— vertically above diaphragm openings 4 4—.

9 9— are tanks, the bottom ends of which are open and adapted to fit in diaphragm openings 4 4—; the open tops of these tanks are adapted to fit rigidly within top plate openings 8 8—; a flange 10, cast as a part of top plate, on the underside thereof at each opening, is adapted to fit closely around the top of each tank.

11—11— are lids hinged on the tanks.

12 is a slide provided with a knob 14; said slide fits loosely between diaphragm 3 and plate 5 and contains an opening, orifice or cavity 15 which is of predetermined size to accurately measure or scale the substance to be measured or weighed.

16 is a rearward extension of slide 12, its rear end provided with an upwardly projecting boss 17 and a downwardly projecting boss 18. Said boss 17 is mounted on said extension 16 to fit loosely in slot 19 provided in the diaphragm to act as an inside guide and stop for said slide.

20 is a locking plate on shaft 1 having a flanged guard 21 around its circular edge with which said boss 18 engages to prevent slide 12 being drawn out, except when in front of opening 22, until boss 18 is rotated into position to be drawn through the single opening 22 in said guard. 23 23 are extensions of said guard 21 projecting forward, one on either side of said opening 22; these extensions tend to keep slide 12 from being rotated from its proper position when being pulled out to be filled. 24 is a detached scoop directly below and in front of said opening 22 in the guard to receive the material which has been measured or weighed.

25 25 are guides on plate 5 to keep slide 12 in position thereon.

26 26— are rods connecting and holding the top plate and diaphragm in position.

27 is a flanged disk attached to tank with center cut out for insertion of card with name of the material in the tank.

A tank, or any number of them, having been supplied with seed or other material, the machine is revolved on the shaft until the tank containing the kind of seed or material desired and the slide directly beneath said tank are directly over the scoop. This position has brought lug 18 on slide 12 directly in front of opening 22. Slide 12 may now be drawn out until cavity 15 is directly under opening 4. Cavity 15 will now fill with seed or other material. Slide 12 is then pushed in until the opening 4 is closed. The slide is then still further pushed in until cavity 15 is past plate 5 when the material in the cavity will flow into scoop 24.

What we claim and desire to secure by Letters Patent, is:—

1. In a scaling machine the combination of a base, a vertical shaft rigidly carried thereon, a plurality of tanks revoluble around the shaft and provided with lids, a top plate provided with openings having flanges adapted to engage the tops of the tanks, a diaphragm provided with slots and with openings to receive the bases of the tanks, a locking plate on the shaft below the diaphragm having a flanged guard provided with a single outlet, a circular plate spaced below the tanks, slides supported by said circular plate, and guides for the slides, rearward extensions of said slides, upper bosses thereon to travel in said diaphragm slots and lower bosses thereon to engage with said flanged guard and travel through said outlet and a removable scoop to receive the measured or scaled commodity, substantially as set forth and shown.

2. In a scaling machine the combination of a support and center shaft, a plurality of tanks, a top plate and a diaphragm each provided with openings to receive the top and bottom of said tanks respectively, a lock plate, on said shaft spaced below the diaphragm, a flanged guard on said lock plate provided with a single outlet, a plurality of slides below said tanks and a supporting plate therefor, the cavities back of said slides, rearward extensions and bosses thereon adapted to engage with said diaphragm and guard and a removable scoop for receipt of the scaled or measured commodity, substantially as shown and set forth.

3. In a scaling machine a rigidly set shaft and lock plate and guard thereon having a single outlet, tanks revoluble around said shaft, slides beneath said tanks and their supporting plate and an extension with bosses engaging said guard, substantially as set forth and shown.

In witness whereof we have hereunto set our hands in presence of two witnesses.

ALBERT L. BURRI.
BERTRAM C. DONNELLY.

Witnesses:
  M. B. MORTON,
  LOYD A. WALKER.